3,294,640
CONTROLLING BLOOD SUGAR WITH SULFONYL PYRAZOLES
Milton Wolf, Chester, Pa., assignor to American Home Products Corporation, New York, N.Y., a corporation of Delaware
No Drawing. Filed Dec. 2, 1965, Ser. No. 511,217
7 Claims. (Cl. 167—65)

This is a continuation-in-part of application Serial Number 265,039, filed on March 14, 1963, now abandoned.

This invention relates to a method of controlling the sugar content of blood by the administration of sulfonyl pyrazoles.

The method of the present invention comprises in the broadest sense the administration to an animal of a compound corresponding to the following structual formula:

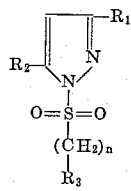

wherein $R_1$ and $R_2$ are selected from the group consisting of lower alkyl, lower alkoxy and lower alkoxyalkyl;

$R_3$ is selected from the group consisting of hydrogen, lower alkyl, napthyl, $-N(R_4)_2$ wherein $R_4$ is lower alkyl, and

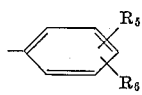

wherein $R_5$ is hydrogen or halogen and $R_6$ is hydrogen, halogen, trifluoromethyl, nitro, amino, lower alkyl or lower alkoxy; and $n$ has a value of from 0 to 2 with the proviso that $n$ has a value of at least 1 when $R_3$ is hydrogen.

It has been found according to the present invention that if a compound of the aforementioned formula is combined with a non-toxic, therapeutically administrable vehicle a composition is obtained which, when administered in the dosage amounts hereinafter defined, is most effective in controlling the sugar content of animal blood.

The hypoglycemic compositions employed in the method of the present invention are prepared in a manner that permits administration of therapeutic dosage amounts of from 1 mg. to about 900 mg. per day of the active principle. Preferably the new compositions are administered at a dosage rate of from about 10 mg. to 750 mg./day. In preparing compositions according to the present invention, a selected sulfonyl pyrazole of the aforesaid type is combined with an appropriate vehicle in an amount of from 1 to 500 mg./cc. of vehicle and preferably from 5 to 100 mg. of the active principle/cc. of the vehicle. Typical of the vehicles suitable for the compositions of the present invention are water, propylene glycol, hydro-alcohols, alkyl cellulose such as methylcellulose and U.S.P. syrups as well as other similar vehicles. When a hydro-alcohol is used as the vehicle, for example, ethanol, it will normally be present in an amount of from 10 to 30 percent of the aqueous solution. The alkylcellulose will also be generally used as an aqueous solution or slurry in which the cellulose will be present in an amount of from 1 to about 20 percent of the aqueous carrier. Included in the syrup type vehicles referred to above are sorbitol-water, sucrose-water and similar polyols such as glycerin.

In preparing liquid compositions for utilization in the method of this invention, the selected sulfonyl pyrazole will be present in an amount, of from about 5 to about 100 mg. per cc. of the selected vehicle. These compositions may then be administered according to the method of this invention orally, intramuscularly and intraperitoneally. Quite obviously the degree of control of the level of sugar in the blood which can be accomplished according to the method of the present invention will depend on the amount of the active principle present in a given composition and the total amount of the composition administered in a time period. As has been suggested, it is preferred that the sulfonyl pyrazoles of the present invention be administered so as to provide a dosage of from about 10 mg. to about 750 mg./day, the preferred rate. When administered to lower species of animals, a higher dosage rate will be used, for example from about 10 mg. to about 100 mg./kg.

The sulfonyl pyrazoles employed in the method of this invention may also be prepared in tablet form. In such form, the amount of the selected sulfonyl pyrazole can of course be varied as desired. A typical tablet which may be employed contains: 250 mg. of a selected sulfonyl pyrazole is mixed with 10 mg. of powdered sucrose, 50 mg. powered lactose and 10 mg. of calcium sulfate dihydrate. The mixture is granulated with starch paste and dried at 120° F. The dried mixture, after being sieved through a No. 20 screen, has added thereto through a No. 40 screen, 6.5 mg. of syloid 244 (powdered silicate—W. R. Grace Company, New York, New York), 10 mg. amberlite XE88 (potassium salt of carboxy acid cation exchange resin—Rohm and Haas Company, Philadelphia, Pennsylvania), 7.5 mg. magnesium stearate and 360 mg. of powdered corn starch. The composition is mixed and pressed into tablets. In such form the aforementioned sulfonyl pyrazoles may be administered orally, twice to three times daily as necessary to provide the desired daily dosage.

The compounds used in the compositions of the present invention may be prepared by several routes. Preferably they are prepared by reacting a selected, substituted sulfonyl hydrazide with a low molecular weight aliphatic dione, for example 2,4-pentanedione, in approximately equimolar amounts preferably in the presence of an inert solvent, such as dimethyl formamide, at a temperature of from 0–100° C. When the reactants are admixed in the manner described, a precipitate develops within a few minutes. The mixture is then stirred for an additional period of from 30 minutes to 2 hours to insure completion of the reaction. The product, when in a crystalline form, may then be recovered by filtration and such recrystallization as is desired. The product may also be obtained as an oil from which the final product is recoverable by extraction and distillation.

The foregoing method unexpectedly avoids the decomposition of negatively substituted arylsulfonhydrazides as normally occur when reflux of such reactants is carried out in alcohol.

An alternate method of preparation of the compounds employed in the present invention involves the reaction of a substituted sulfonyl halide with a 3,5-disubstituted pyrazole in an inert solvent with an acid acceptor such as triethylamine or an excess of the selected pyrazole. In accord with this procedure, the substituted sulfonyl halide, for example methanesulfonyl chloride, is added with stirring to a suspension of the disubstituted pyrazole in a solvent, such as tetrahydrofuran, over a period of about 10–30 minutes. The resulting solution is refluxed on a steam bath for from 5 to 20 minutes. After initiation of reflux a solid (e.g. 3,5-dimethylpyrazole hydrochloride) begins to separate out. When this occurs, the mixture is chilled in an ice bath, filtered and the solid washed with ether. The filtrate is then concentrtaed in vacuo. A residual oil product crystallizes on scratching and trituration with pentane or the equivalent. The product is then recrystallized if desired according to conventional practice.

A further method of preparing compounds of the present invention, specifically those in which $R_3$ of the aforesaid formula is represented by the group $-N(R_4)_2$ in which $R_4$ is lower alkyl, is based on a solution of selected dialkyl sulfamyl chloride in benzene being added rapidly to the selected pyrazole and triethylamine as acid acceptor. The resulting solution is refluxed for a period of from 1 to 4 hours with benzene being removed by distillation. The resulting mixture is then further refluxed for a period of from 2 to 6 hours. The pasty mixture remaining is diluted with ether, with the solid separating out being recovered by filtration. Concentration of the ether filtrate provides an oil-like product which is taken up in ether, washed with a saturated salt solution, filtered through anhydrous sodium sulfate and concentrated in vacuo to provide the final product. In the foregoing method of preparation, the ether extraction step described may be omitted with the desired product being recovered in the manner described above.

The hypoglycemic activity of the sulfonyl pyrazoles of this invention may be demonstrated when the compounds are administered to animals by either of the following standard test procedures:

(A) The animal is fasted overnight and a control blood sample is then taken. A test dose of the particular sulfonyl pyrazole is administered and blood samples taken at regular intervals. The blood samples are analyzed for their sugar content and compared with the initial sample which acts as the control;

(B) Alloxan monohydrate is administered to the animal until a high glycosuria is observed. Thereafter, the animal is treated in the manner described in Procedure A.

Reference to the specific examples which follow will provide a better understanding of the present invention but it is not intended to limit the scope thereof.

EXAMPLE I

To prepare 1 - benzenesulfonyl-3,5-dimethylpyrazole, 2,4-pentanedione (6.0 g., 6.2 ml., 0.060 m.) is added to a solution of benzenesulfonhydrazide (10.0 g., 0.058 m.) in dimethylformamide (25 ml.) and 2 N hydrochloric acid (25 ml.) and chilled in an ice bath. After 2–3 minutes a solid begins to separate. The mixture is stirred mechanically at 0–5° C. for 10 minutes, then at room temperature for 45 minutes. The colorless crystalline solid is collected, washed with ether, dried at 50° C./ house vac. Yield 12.8 (95.7 percent), m. 67–71° C. (uncorrected). A tablet form of the foregoing compound suitable for purposes of the present invention is as follows:

| | Mg. |
|---|---|
| 1-benzenesulfonyl-3,5-dimethylpyrazole | 250 |
| Powdered sucrose | 10 |
| Powdered lactose | 50 |
| Calcium sulfate, dihydrate | 10 |

Mix and granulate with starch paste, tray and dry at 120° F. Sieve (No. 20 screen) and add through No. 40 screen:

| | Mg. |
|---|---|
| Syloid 244 (silicate powder—W. R. Grace Co.) | 6.5 |
| Amberlite XE88 (cationic resin—Rohm & Haas Co.) | 10.0 |
| Magnesium stearate | 7.5 |
| Powdered corn starch, redried q.s. ad | 350.0 |

Mix and compress into tablet form.

EXAMPLE II

When the procedure of Example I is repeated with the hereinafter listed starting compounds the following sulfonyl pyrazoles are obtained:

| Starting Compound | Product |
|---|---|
| 2,4-pentanedione and p-bromobenzenesulfonhydrazide. | 1-(p-bromophenylsulfonyl)-3,5-dimethylpyrazole, 130–132° C. |
| 2,4-pentanedione and p-methoxybenzenesulfonhydrazide. | 1-(p-methoxyphenylsulfonyl)-3,5-dimethylpyrazole, 122.5–124.5° C. |
| 2,4-pentanedione and 2-naphthalenesulfonhydrazide. | 1-(2-naphthylsulfonyl)-3,5-dimethylpyrazole, 106–106.5° C. |
| 2,4-pentanedione and β-p-tolylethanesulfonhydrazide. | 1-(β-p-tolylethylsulfonyl)-3,5-dimethylpyrazole, 61–64° C. |
| 2,4-pentanedione and o-nitrobenzenesulfonhydrazide. | 1-(o-nitrophenylsulfonyl)-3,5-dimethylpyrazole, 115–117° C. |
| 2,4-pentanedione and 3,4-dichlorobenzenesulfonhydrazide. | 1-(3,4-dichlorophenylsulfonyl)-3,5-dimethylpyrazole, M.P. 105°–106° C. |
| 2,4-pentanedione and p-nitrobenzenesulfonhydrazide. | 1-(p-nitrophenylsulfonyl)-3,5-dimethylpyrazole. |

EXAMPLE III

Methanesulfonyl chloride (11.5 g., 7.75 ml., 0.10 mole) is added dropwise with stirring to a suspension of 3,5-dimethylpyrazole (19.2 g., 0.20 m.) in tetrahydrofuran (70 ml.) over a period of about 10 minutes. A clear solution is obtained, which is refluxed on a steam bath for 15 minutes. After 1–2 minutes a solid begins to separate (3,5 - dimethylpyrazole hydrochloride). The mixture is chilled in an ice bath, filtered, and the solid washed with ether and the filtrate concentrated in vacuo. The residual oil crystallizes on scratching and trituration with pentane. The product is air-dried, yield 16.7 (96.0 percent), M.P. 54–57° C. (uncorrected). The solid which separated during the reflux period weighs 13.0 g. (97.0 percent), M.P. 239.5–242.5° C. (uncorrected). The crude product is recrystallized from methylene chloride-pentane to yield colorless prisms of 1-(methylsulfonyl)-3,5-dimethylpyrazole 10.6 g. (60.9 percent), M.P. 56–58° C. (uncorrected). A composition using this compound is as follows:

| | |
|---|---|
| 1-(methylsulfonyl)-3,5-dimethylpyrazole mg | 100 |
| Ethanol cc | 1 |

In a similar manner, 1-(α-tolylsulfonyl)-3,5-dimethylpyrazole, M.P. 74.5–76.5° C.; 1-(m-trifluoromethyl-phenylsulfonyl)-3,5-dimethylpyrazole, M.P. 56–57° C. and 1-(phenylsulfonyl)-3,5-bis(methoxymethyl)pyrazole are prepared.

EXAMPLE IV

N,N-dimethylsulfamyl-3,5-dimethylpyrazole is prepared as follows:

A solution of N,N-dimethylsulfamyl chloride (14.4 g., 0.10 m.) in anhydrous ether (25 ml.) is added rapidly to a solution of 3,5-dimethylpyrazole (9.6 g., 0.1 m.) and triethylamine (10.0 g., 13.9 ml., 0.10 m.). The resulting solution is refluxed on a steam bath for 3 hours. Benzene (100 ml.) is added and ether is removed by distillation. The resulting mixture is refluxed for 4 hours. The pasty mixture is diluted with ether (125 ml.) and the solid separated by filtration. Concentration of the filtrate affords a yellow oil (17.2 g.) which is taken up in ether, washed with water and a saturated salt solution, filtered through anhydrous sodium sulfate and concentrated in vacuo. The residual oil (desired product) was distilled in vacuo, yield 11.2 g. (55.1 percent), B.P. 101–102° C./1–2 mm.

Similarly, 1-(1-butylsulfonyl)-3,5-dimethylpyrazole is prepared.

EXAMPLE V

To prepare 1-(p-chlorophenylsulfonyl)-3,5-dimethylpyrazole, 2,4-pentanedione (0.066 m.) is added to a solution of p-chlorobenzenesulfonhydrazide (0.06 m.) in dimethylformamide (50 ml.) and 2 N hydrochloric acid (50 ml.) and chilled in an ice bath. After 2–3 minutes, a solid begins to separate. The mixture is stirred mechanically at 0–5° C. for 10 minutes, then at room temperature for approximately 45 minutes. The crystalline product is collected, washed with water and dried. M.P. 121–122° C.

EXAMPLE VI

To prepare 1-phenylsufonyl-3-methoxymethyl-5-methylpyrazole, benzenesulfonhydrazide is reacted with 1-methoxy-2,4-pentanedione according to the method of Example V, B.P. 157–163° C./0.4–0.5 mm. Along with the product identified, this reaction also produces the 5-methoxymethyl-3-methyl isomer, namely 1-phenylsulfonyl-5-methoxymethyl-3-methylpyrazole.

EXAMPLE VII

To prepare 1-(o-trifluoromethylphenylsulfonyl)-3,5-bis(methoxymethyl)pyrazole, o-trifluoromethylbenzenesulfonyl chloride is reacted with 3,5-bis(methoxymethyl)pyrazole in the presence of triethylamine in benzene solution. Choice of a selected sulfonyl chloride will of course permit preparation of the meta and para substituted product.

EXAMPLE VIII

Male rats weighing between 170–200 grams are fasted overnight, thereafter, a control blood sample is taken from the trail. A test dose of a particular sulfonyl pyrazole is administered by stomach tube and subsequently, blood samples are taken at hourly intervals for five hours.

Using the aforesaid procedure, the following sulfonylpyrazoles were tested:

| Compounds | Dose, mg./kg. | Number of Rats | Average Percent Blood Sugar Change from Initial Blood Sample | | | | |
|---|---|---|---|---|---|---|---|
| | | | 1 hr. | 2 hrs. | 3 hrs. | 4 hrs. | 5 hrs. |
| 1-benzenesulfonyl-3,5-dimethylpyrazole | 30 | 8 | −14.6 | −12.6 | −19.3 | −22.6 | −23.0 |
| 1-(p-bromophenylsulfonyl)-3,5-dimethylpyrazole. | 60 | 4 | −8.0 | −22.2 | −10.3 | −1.1 | +1.5 |
| 1-(o-nitrophenylsulfonyl)-3,5-dimethylpyrazole. | 15 | 4 | −10.0 | 23.9 | −21.7 | −23.0 | −19.0 |
| 1-(p-nitrophenylsulfonyl)-3,5-dimethylpyrazole. | 30 | 4 | −13.9 | −22.4 | −16.1 | −12.1 | −13.1 |
| 1-(methylsulfonyl)-3,5-dimethylpyrazole | 30 | 7 | −6.6 | −7.8 | −16.8 | −17.5 | −16.5 |
| 1-(α-tolylsulfonyl)-3,5-dimethylpyrazole | 30 | 4 | +1.0 | −12.5 | −6.7 | −13.5 | −10.7 |
| Non-treated normal rats | 0 | 10 | −2.1 | −5.2 | +2.2 | +6.1 | +7.0 |

The blood sugar values, at each specified time interval, compared to the initial value for each individual rat were recorded. In this regard, each rat acted as its own control. Further, a group of non-treated normal rats were tested to indicate normal blood sugar variations. These results obviously indicate that these compounds have substantial hypoglycemic activity.

EXAMPLE IX

Male rats weighing between 170–200 grams are treated subcutaneously with alloxan monohydrate, 180 mg./kg., dissolved in McIllvaine's citrate phosphate buffer at pH 4.0. The urine is checked for its sugar content each day and a high glycosuria is usually observed in 24 to 48 hours. Five to ten days after the alloxan treatment, the rats are fasted overnight. Thereafter, a control blood sample is taken from the tail and a test dose of a particular sulfonyl pyrazole administered by stomach tube. Subsequently, blood samples are taken at hourly intervals for five hours.

Using the aforementioned procedure the following sulfonylpyrazoles were tested:

What is claimed is:

1. A method of controlling the level of sugar in blood which comprises administering to an animal from about 10 mg. to about 750 mg. per day of a compound represented by the formula:

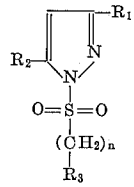

wherein $R_1$ and $R_2$ are selected from the group consisting of hydrogen, methyl, methoxymethyl;

$R_3$ is selected from the group consisting of hydrogen, lower alkyl, naphthyl, dimethylamino and

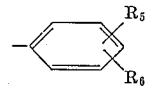

wherein $R_5$ is selected from the group consisting of hydrogen and halogen and $R_6$ is selected from the group consisting of hydrogen, halogen, trifluoromethyl, nitro, amino, methyl and methoxy; and $n$ has a value of from 0 to 2 inclusive with the proviso that $n$ has a value of at least 1 when $R_3$ is hydrogen.

2. A method as described in claim 1 wherein the compound administered is 1-benzenesulfonyl-3,5-dimethylpyrazole.

3. A method as described in claim 1 wherein the compound administered is 1-(methylsulfonyl)-3,5-dimethylpyrazole.

4. A method as described in claim 1 wherein the compound administered is 1-(p-bromophenylsulfonyl)-3,5-dimethylpyrazole.

5. A method as described in claim 1 wherein the compound administered is 1-(o-nitrophenylsulfonyl)-3,5-dimethylpyrazole.

6. A method as described in claim 1 wherein the compound administered is 1-(p-nitrophenylsulfonyl)-3,5-dimethylpyrazole.

7. A method as described in claim 1 wherein the compound administered is 1-(α-tolylsulfonyl)-3,5-dimethylpyrazole.

| Compounds | Dose, mg./kg. | Number of Rats | Average Percent Blood Sugar Change from Initial Blood Sample | | | | |
|---|---|---|---|---|---|---|---|
| | | | 1 hr. | 2 hrs. | 3 hrs. | 4 hrs. | 5 hrs. |
| 1-benzenesulfonyl-3,5-dimethylpyrazole | 15 | 7 | −8.8 | −29.7 | −31.9 | −24.8 | −18.0 |
| 1-(o-nitrophenylsulfonyl)-3,5-dimethylpyrazole | 15 | 7 | −10.0 | −25.6 | −38.0 | −46.2 | −43.3 |
| 1-(p-nitrophenylsulfonyl)-3,5-dimethylpyrazole | 15 | 7 | +1.8 | −22.8 | −30.3 | −40.5 | −42.3 |
| 1-(α-tolylsulfonyl)-3,5-dimethylpyrazole | 30 | 4 | −10.2 | −23.3 | −32.1 | −39.0 | −34.8 |
| Non-treated normal rats | 0 | 7 | +3.9 | +8.9 | +6.9 | +3.6 | +0.7 |

No references cited.

JULIAN S. LEVITT, *Primary Examiner.*

JEROME D. GOLDBERG, *Assistant Examiner.*